(12) United States Patent
Suda et al.

(10) Patent No.: US 7,209,246 B2
(45) Date of Patent: Apr. 24, 2007

(54) INFORMATION PROCESSING APPARATUS AND METHOD FOR PROCESSING READ IMAGE DATA

(75) Inventors: Aruna Rohra Suda, Yokohama (JP); Masayuki Takayama, Kashiwa (JP); Masanori Wakai, Tokyo (JP); Suresh Jeyachandran, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/178,896

(22) Filed: Oct. 27, 1998

(65) Prior Publication Data

US 2002/0163663 A1 Nov. 7, 2002

(30) Foreign Application Priority Data

Oct. 29, 1997 (JP) .................... 9-297166

(51) Int. Cl.
*G06F 15/00* (2006.01)

(52) U.S. Cl. .................... 358/1.14; 358/1.17; 358/1.18

(58) Field of Classification Search ............... 358/1.15, 358/1.16, 402, 403, 404, 407, 408, 434, 443, 358/468, 1.14; 382/181, 182, 184; 399/83
See application file for complete search history.

(56) References Cited

U.S. PATENT DOCUMENTS

| 5,095,373 | A | * | 3/1992 | Hisano | 358/402 |
| 5,140,380 | A | * | 8/1992 | Nakamura et al. | 399/408 |
| 5,321,802 | A | | 6/1994 | Furuya et al. | 395/146 |
| 5,432,532 | A | | 7/1995 | Mochimaru et al. | 347/176 |
| 5,438,426 | A | | 8/1995 | Miake et al. | 358/403 |
| 5,457,543 | A | | 10/1995 | Maeda | 358/401 |
| 5,465,167 | A | * | 11/1995 | Cooper et al. | 358/468 |
| 5,528,375 | A | | 6/1996 | Wegeng et al. | 358/296 |
| 5,548,666 | A | * | 8/1996 | Yoneda et al. | 382/276 |
| 5,588,135 | A | * | 12/1996 | Tanaka | 711/160 |
| 5,724,490 | A | * | 3/1998 | Shibaki et al. | 358/1.15 |
| 5,839,033 | A | * | 11/1998 | Takahashi et al. | 399/187 |
| 5,875,263 | A | * | 2/1999 | Froessl | 382/181 |
| 5,877,746 | A | * | 3/1999 | Parks et al. | 345/156 |
| 5,963,966 | A | * | 10/1999 | Mitchell et al. | 707/513 |
| 6,084,988 | A | * | 7/2000 | Kanno et al. | 382/289 |
| 6,088,131 | A | * | 7/2000 | Imai et al. | 358/450 |
| 6,178,273 | B1 | * | 1/2001 | Kuga | 382/305 |
| 6,226,096 | B1 | * | 5/2001 | Ouchi | 358/1.14 |
| 6,339,477 | B2 | * | 1/2002 | Mori | 358/1.14 |

FOREIGN PATENT DOCUMENTS

| EP | 0 618 716 A1 | 10/1994 |
| EP | 0 679 012 | 10/1995 |
| EP | 0 767 578 | 4/1997 |
| WO | WO 95/31063 | 11/1995 |

* cited by examiner

Primary Examiner—Kimberly A. Williams
(74) Attorney, Agent, or Firm—Fitzpatrick, Cella, Harper & Scinto

(57) ABSTRACT

An original is read and the information stored as information targeted for processing, with either printing, transmission or holding being the processing for which the stored information is targeted, and the destination of the processing and either the timing or the time duration of the processing being specified, and the specified processing is carried out on the information targeted for processing. Furthermore, a multiple-page original which has been read is stored as multiple-page documents, with either one page being stored as one document, or specified numbers of pages starting from a specified starting page each being stored as one document.

7 Claims, 21 Drawing Sheets

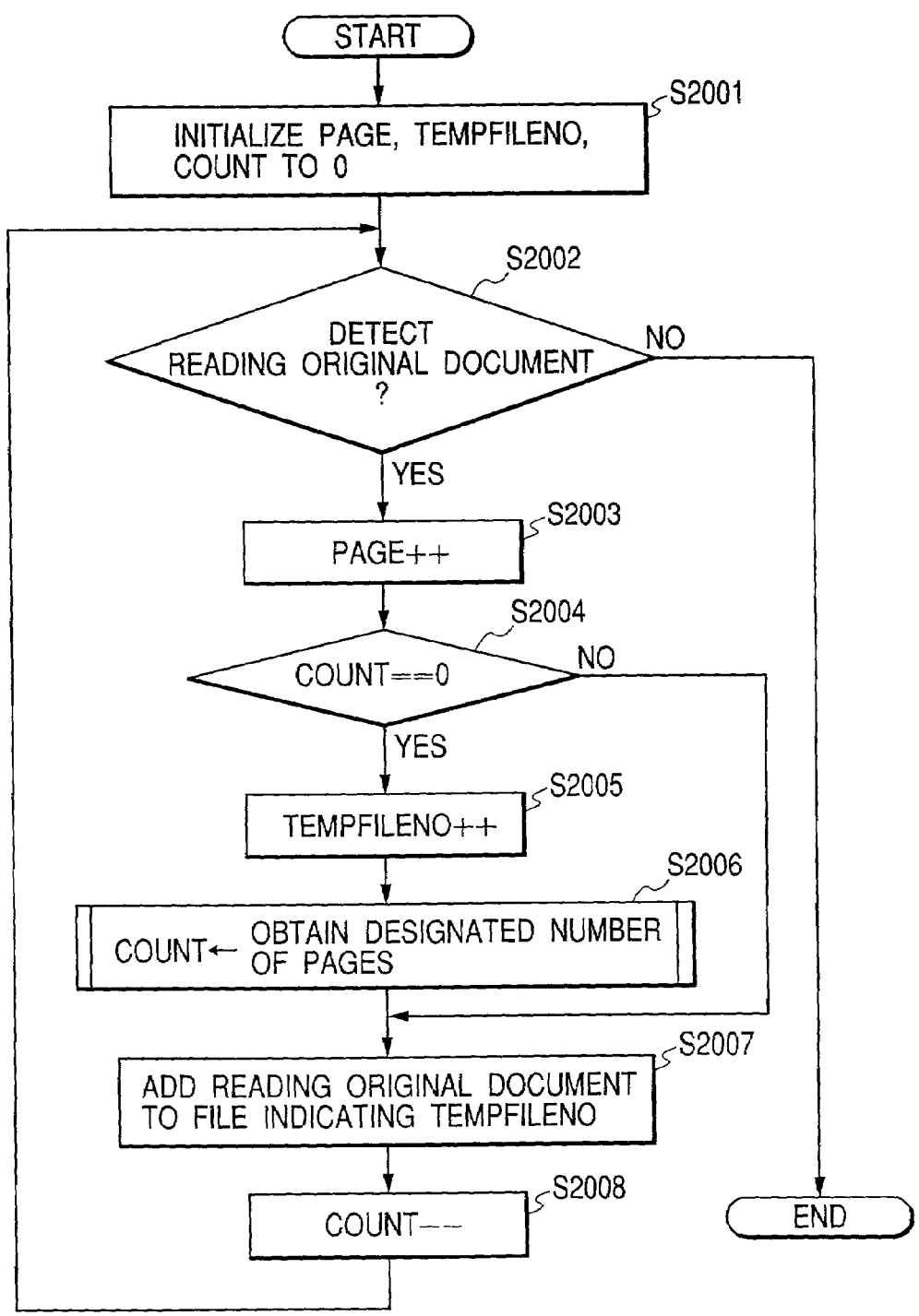

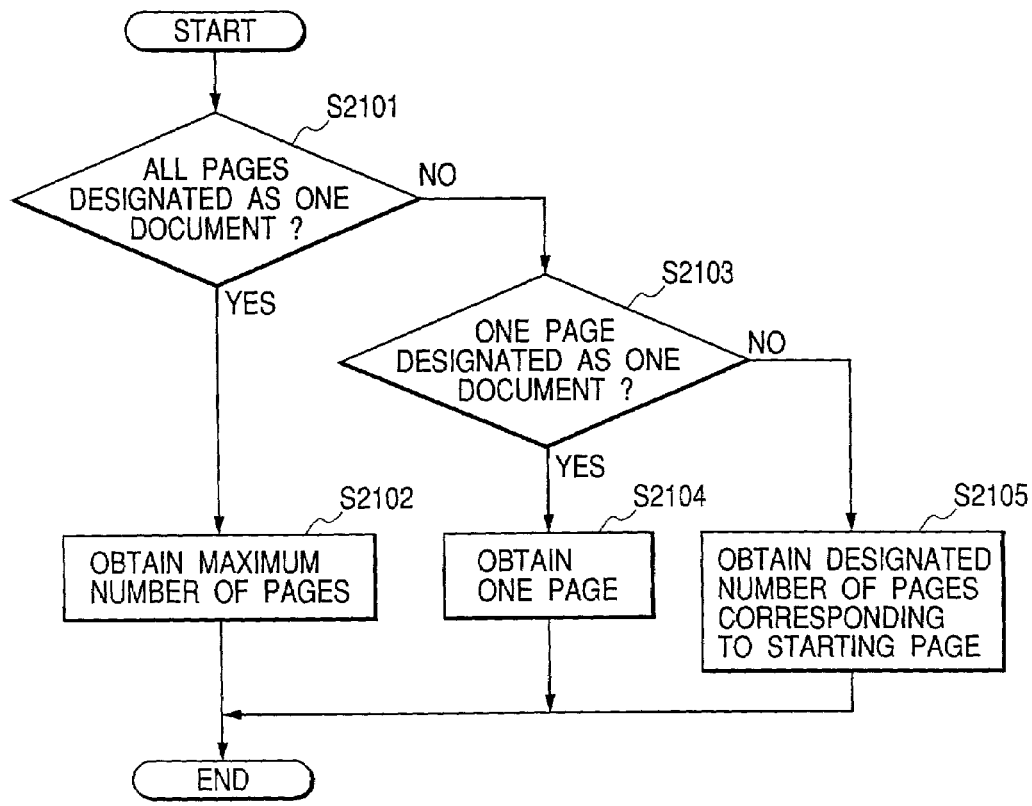

INFORMATION PROCESSING APPARATUS AND METHOD FOR PROCESSING READ IMAGE DATA

BACKGROUND OF THE INVENTION

1. Field of the Invention

The present invention relates to an information processing apparatus and a method capable of reading image data.

2. Related Background Art

Conventionally, scanners have been used as input devices to input image data printed on paper to computers. Some scanners are capable of consecutive reading of multiple originals, and multiple images input to the computer in this manner can be stored in the computer as a single file. Scanners like these input image data in accordance with the control of the computer on the image data reception side, and when used in a network environment, such scanners are unable to perform information processing as their primary role.

SUMMARY OF THE INVENTION

Given this background, the purpose of the present invention is to provide an information processing apparatus and a method by which the specified processing can be carried out on information which has been read, with such information serving as the target of the processing.

Furthermore, another purpose of the present invention is to provide an information processing apparatus and a method capable of dividing information which has been read into multiple independent storing units and storing it.

Based on the present invention, an information processing apparatus is provided with specifying means for specifying numbers of page data consisting of data in document files to be created, by referring to a table which defines the respective numbers of page data for the plurality of document files independently; scanning means for scanning multiple-page data of a document; counting means for setting the number specified for one of the plurality of document files, counting a number of page data scanned by the scanning means and resetting the number specified for next one of the plurality of document files when the counted number reaches the currently set number; dividing means for separating the multiple-page data of the document scanned by the scanning means each time the counted number reaches the specified number, thereby dividing the multiple-page data of the document into a plurality of document data in which each one of the document data corresponds to the respective one of the numbers of page data defined in the table; generation means for generating respective file identifiers for the plurality of document data divided by the dividing means; and file creation means for creating the plurality of document files in a memory and storing the plurality of document data divided by the dividing means into respective document files in correspondence with the respective file identifiers; and a method and computer-readable storage method therefor.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 20 is a flow chart showing the flow of reading processing.

FIG. 21 is a flow chart showing the flow of processing for obtaining the specified number of pages.

FIG. 22 is a drawing showing an example of data specifying the number of pages.

DETAILED DESCRIPTION OF THE PREFERRED EMBODIMENTS

A preferred embodiment relating to this invention will be described in detail with reference to the accompanying drawings.

Figure 1:
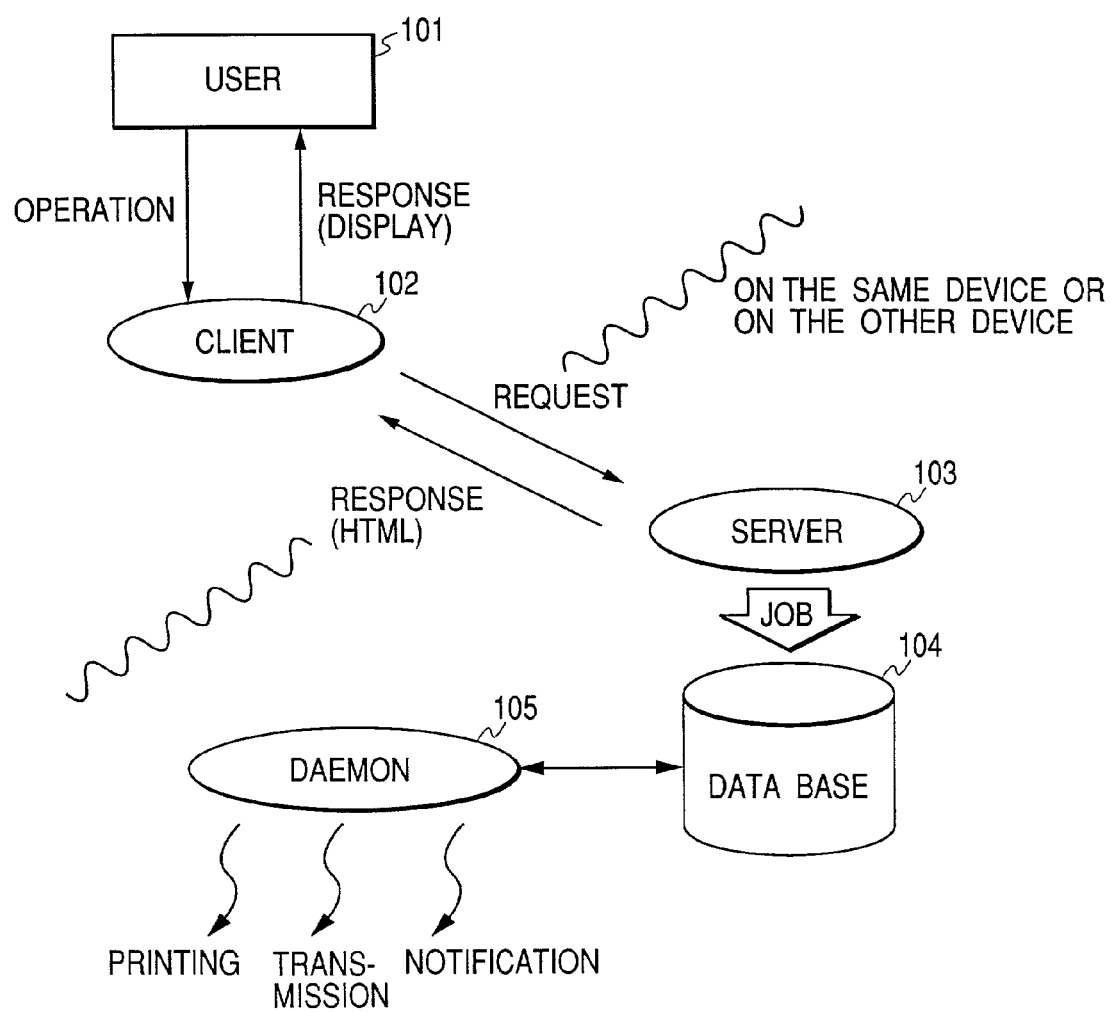
FIG. 1 is a drawing indicating the functional construction of an embodiment.

FIG. 1 is a drawing indicating the functional construction of the embodiment, which shows the relationship between the user 101, client 102, server 103, data base 104, and daemon 105. The client 102 and server 103 may be on the same device, and may also be on separate devices connected by means such as a network.

When an operation of any kind is performed by the user 101 with respect to the client 102, the client 102 generates a request corresponding to the operation and sends it to the server 103. The server 103 interprets the request that has been received, and, through interaction with the data base 104, performs processing such as adding or deleting jobs, and obtaining data. As a result, a corresponding HTML page is created if necessary, and is sent to the client 102. The client 102 displays the HTML page that has been received and invites the user 101 to perform a new operation.

Jobs stored in the data base 104 are monitored by the daemon 105, and the daemon 105 performs processing such as printing, transmission, and notification corresponding to the job satisfying the execution conditions.

Figure 2:
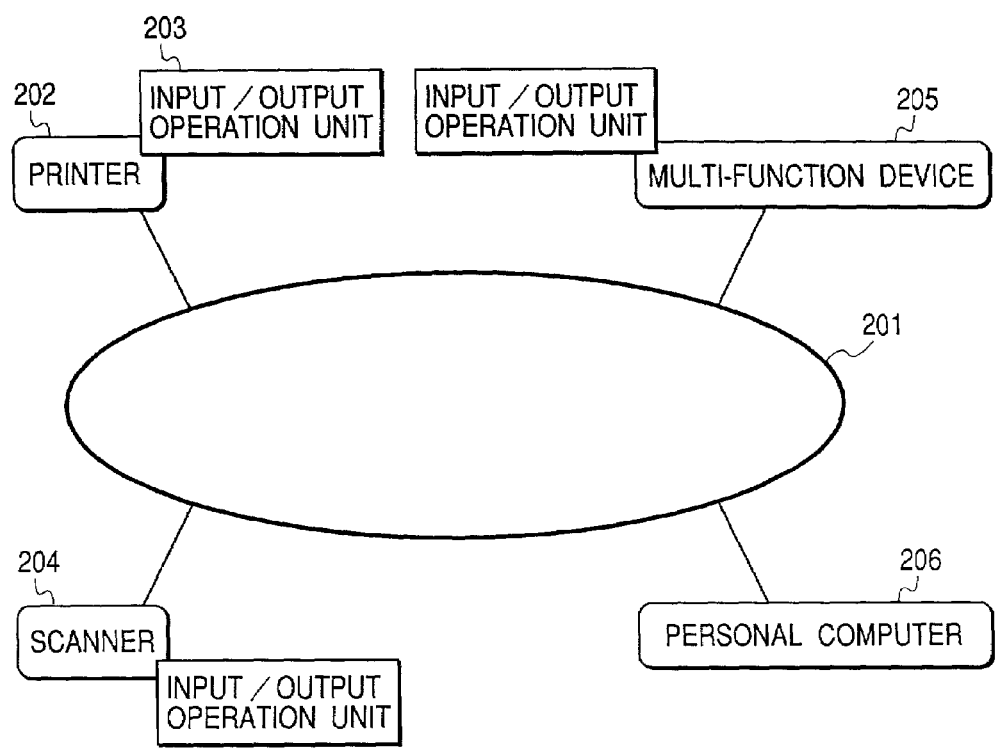
FIG. 2 is a system configuration diagram relating to the present embodiment.

FIG. 2 is a system configuration diagram relating to the present embodiment.

In this drawing, various devices are connected to a network 201 and data is sent and received through the network 201. The printer 202, along with printing data that has been received through the network, is equipped with input/output operation units 203. The input/output operation unit 203, along with displaying various displays to the user, receives instructions from the user. Similarly, the scanner 204 and the multi-function device 205 have input/output operation units. The scanner 204 is a device which optically reads data printed on paper or a similar medium, while the multi-function device 205 has the functions of both the printer 202 and the scanner 204. The personal computer 206 creates documents and images, and controls personal data such as the user's mail and schedule.

The printer 202, scanner 204, multi-function device 205, and personal computer 206 all function as the client and server described previously.

Figure 3:
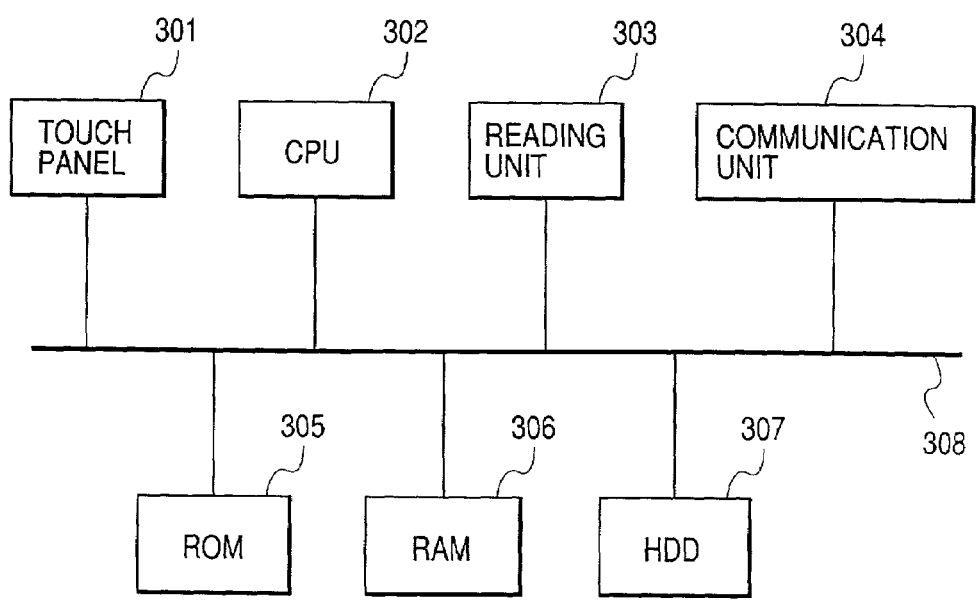
FIG. 3 is a block diagram of the scanner functions relating to the present embodiment.

FIG. 3 is a block diagram of the scanner functions relating to the present embodiment.

In this drawing, the touch panel 301, along with displaying the printer status and menu screens to the user, is capable of selecting menu items and entering text from a keyboard displayed on the screen when the display screen is touched by the user. In place of the touch panel 301, an ordinary display and keyboard may also be provided.

The CPU 302 executes various types of programs, including the processing procedures to be described at a later point, with respect to flow charts, and controls various devices connected by means of the system bus 308. The reading unit 303 reads image information printed on paper or a similar medium. The communication unit 304 sends and receives data, including instructions and status information, between the desktop, printer and other devices, via a network.

The ROM 305 stores fixed data and programs. The RAM 306 stores data and programs temporarily. The hard disk drive (HDD) 307 is capable of storing programs and data permanently, and is used as the data base described previously. The system bus 308 connects the various devices described previously, and is used as a medium by which data, addresses, and control signals are sent and received between devices. The various types of programs, including the processing procedures to be described at a later point, with respect to flow charts, may be stored in the ROM 305, or may be loaded as necessary from the HDD 307 to the RAM 306, before processing is carried out or while processing is being carried out.

Figure 4:
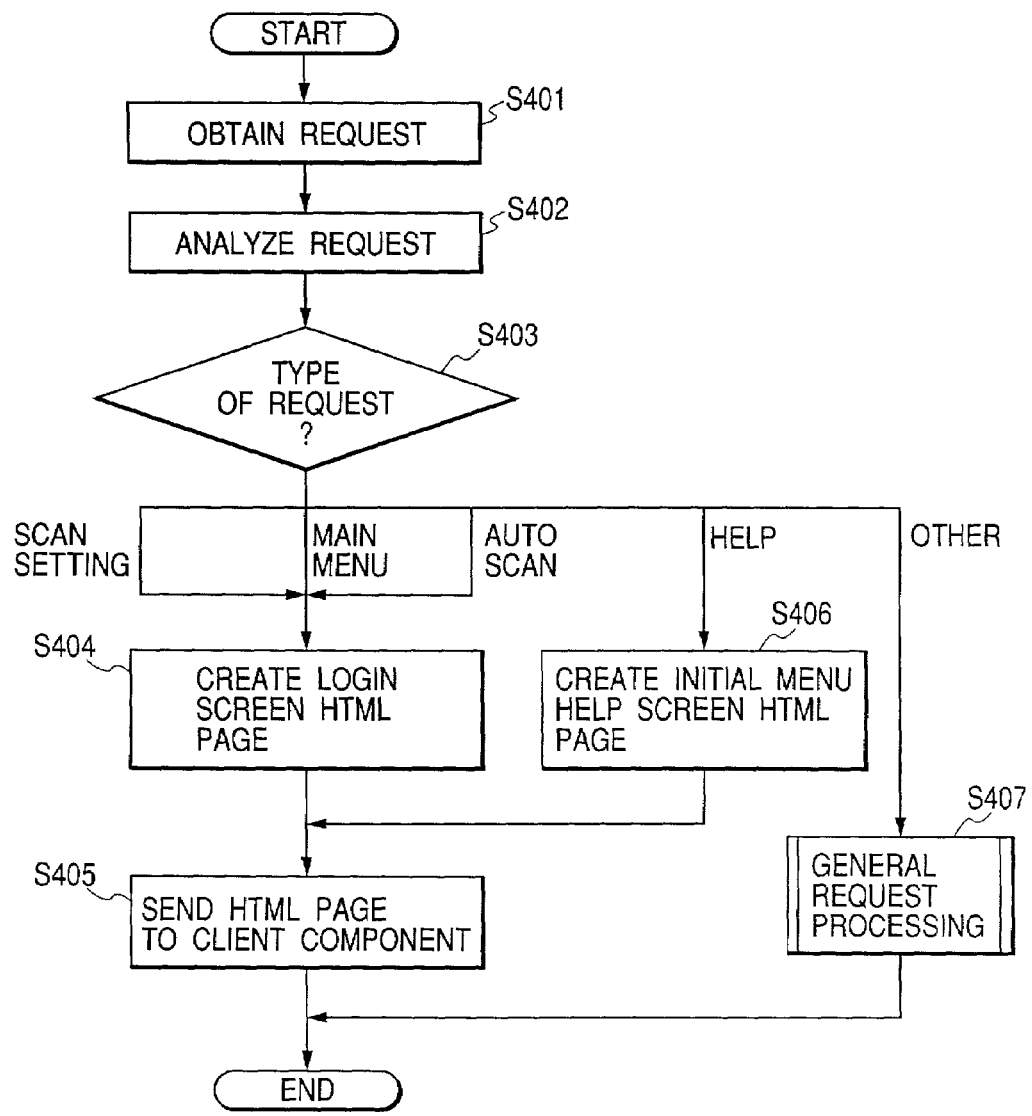
FIG. 4 is a flow chart showing the flow of processing on the initial menu screen.
Figure 13:
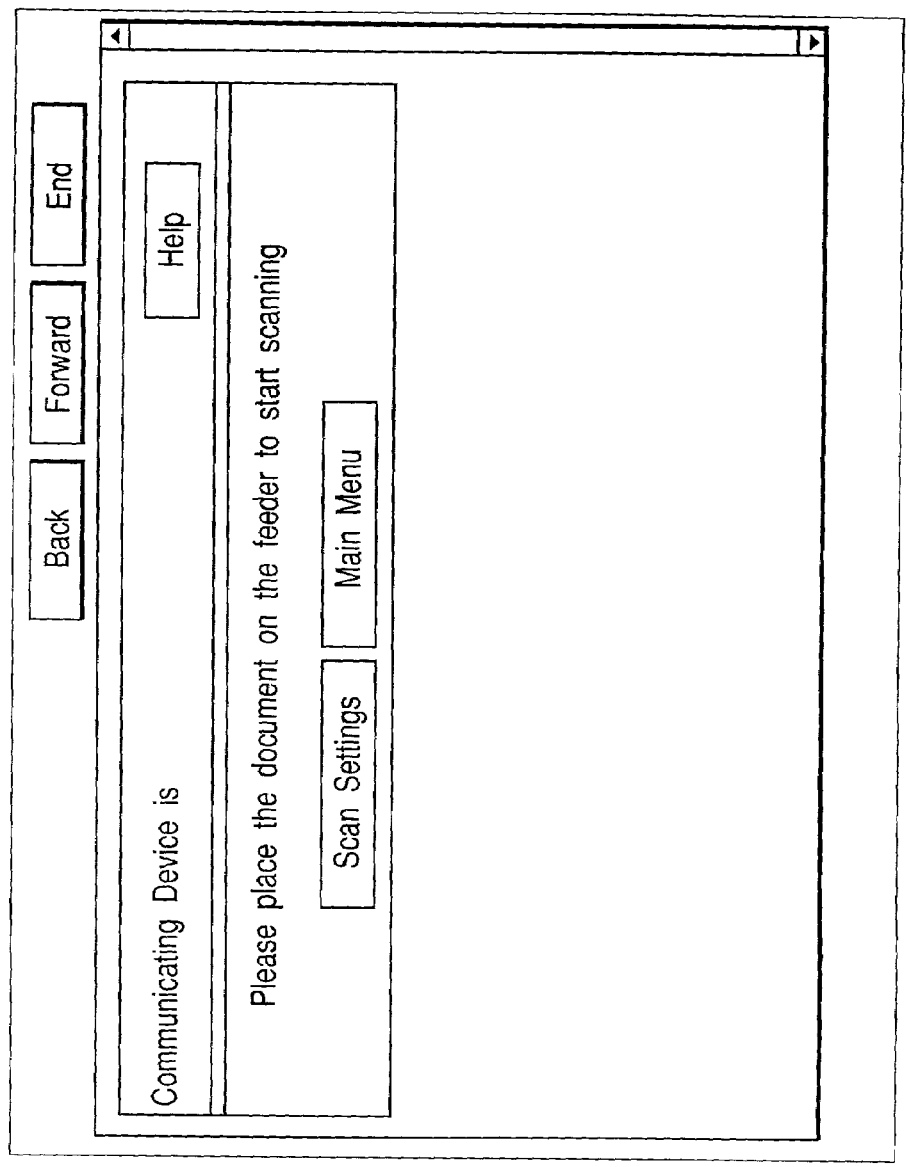
FIG. 13 is a drawing showing an example of an initial menu screen.

FIG. 4 is a flow chart showing the flow of processing on the initial menu screen. This processing corresponds to operations conducted on the initial menu screen displayed when the system is booted. FIG. 13 is a drawing showing an example of an initial menu screen.

With respect to the initial menu screen of FIG. 13, displayed by the client, when an operation of some kind is carried out by the operator, a request corresponding to that operation is sent from the client to the server, and the initial menu screen is booted by the server.

Alternatively, when the operator sets an original on the reading unit 303, the original which has been set on the reading unit is detected, and after the original has been automatically read by the client, an Auto Scan request is sent together with the information that was read from the original to the server, and initial menu screen processing is launched by the server.

When the initial menu screen processing is launched, at step S401, a request is obtained, and next, at step S402, the request is analyzed, with the processing branching to the corresponding processing at the next step S403.

Figure 6:
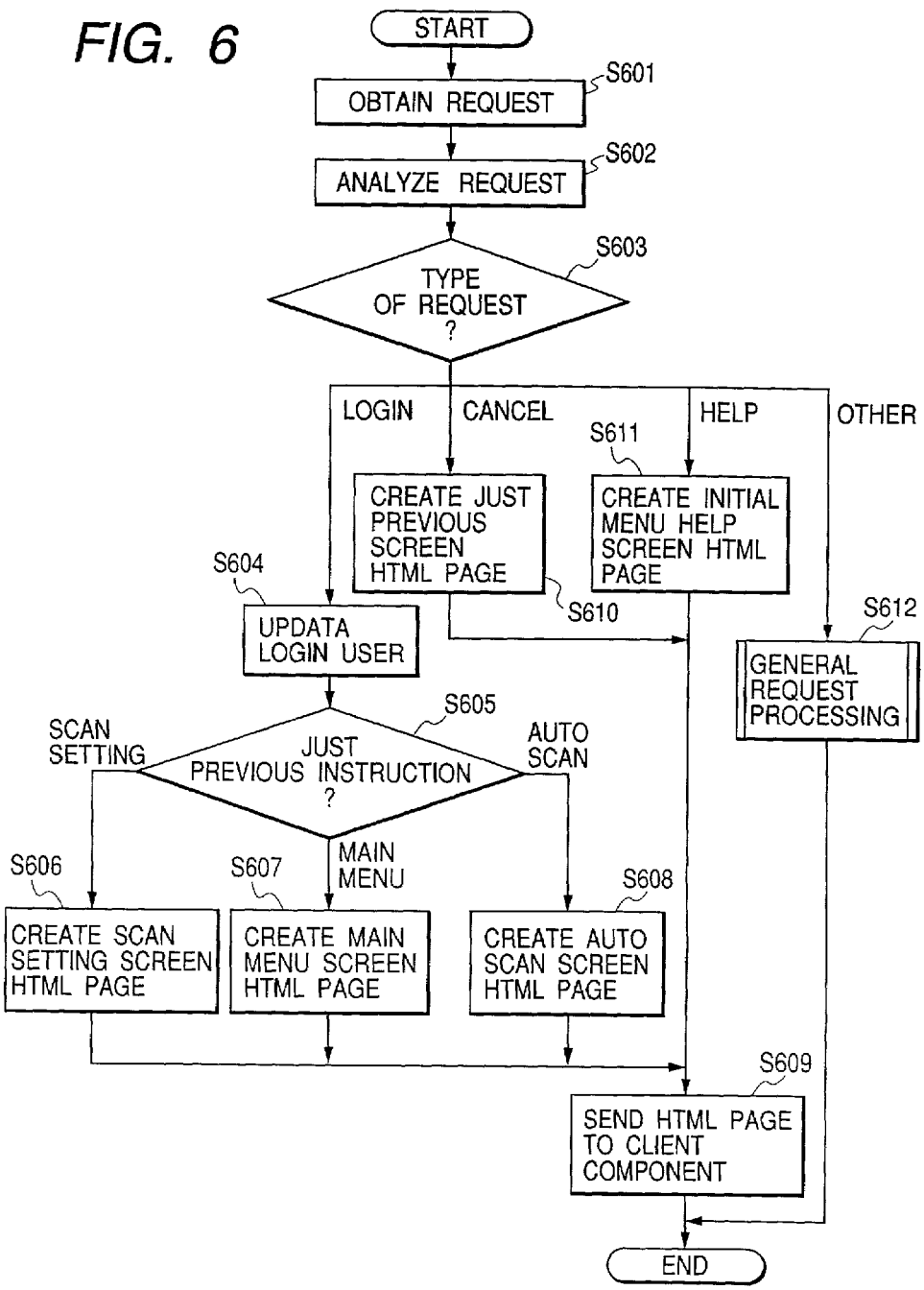
FIG. 6 is a flow chart showing the flow of processing on the login screen.

If the request is a Scan Setting, Main Menu, or Auto Scan request, processing advances to step S404, where a screen HTML page for the login screen processing described at a later point with respect to FIG. 6 is created. This screen HTML page is then sent to the client at the next step S405, and is terminated.

If the request is a Help request, processing advances to step S406, and a screen HTML page for initial menu Help functions is created. Next, at step S405, this page is sent to the client, and is terminated.

Figure 5:
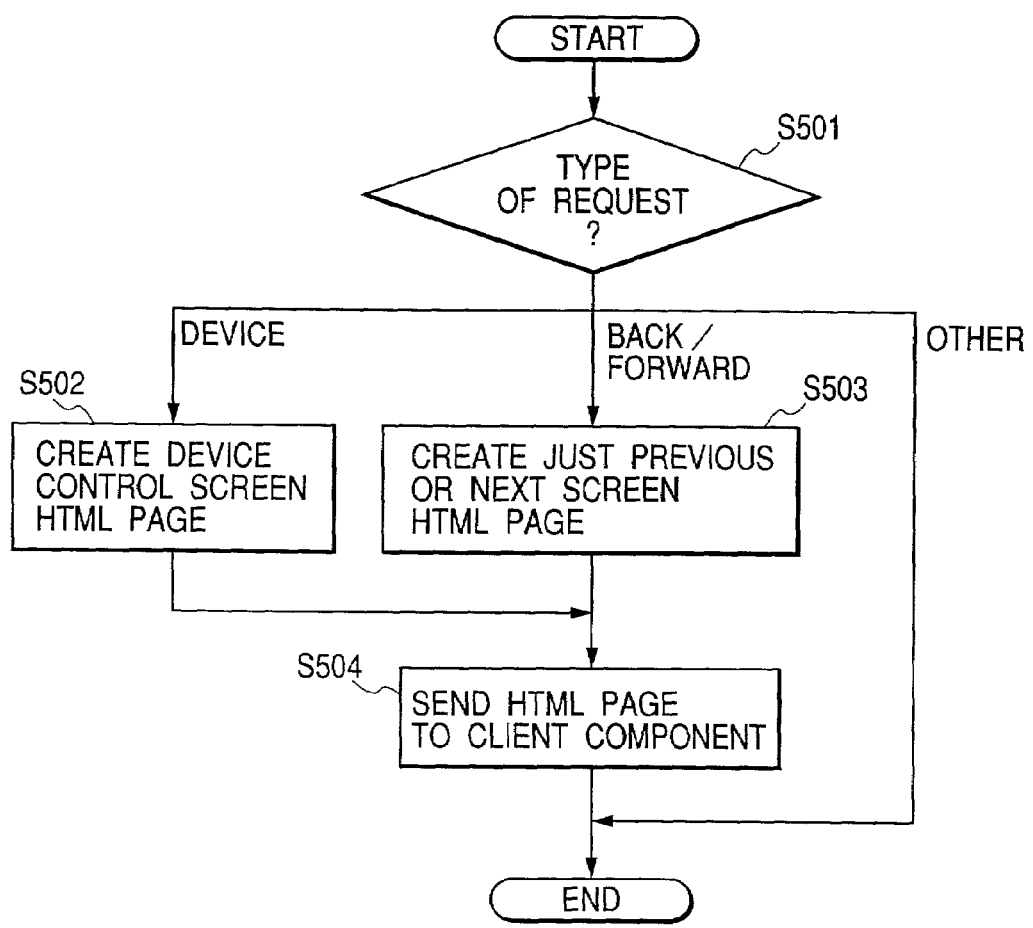
FIG. 5 is a flow chart showing the flow of general request processing.

If the request is any other request, processing advances to step S407, and the general request processing described at a later point with respect to FIG. 5 is executed, the processing corresponding to requests which are common to all of the screens, and is terminated.

FIG. 5 is a flow chart showing the flow of general request processing. General request processing is processing corresponding to requests which are common to all of the screens.

When general request processing is launched, processing branches at step S501, based on the type of request. If the request is a Device request, processing advances to step S502, and a screen HTML page for device management is created. Next, at step S505, this page is sent to the client, and is terminated.

If the request is a Back or Forward request, processing advances to step S503, and a screen HTML page for "Just previous" or "Next" is created. Next, at step S505, this page is sent to the client, and is terminated. If the request is any other request, termination is implemented without any processing being carried out.

Figure 14:
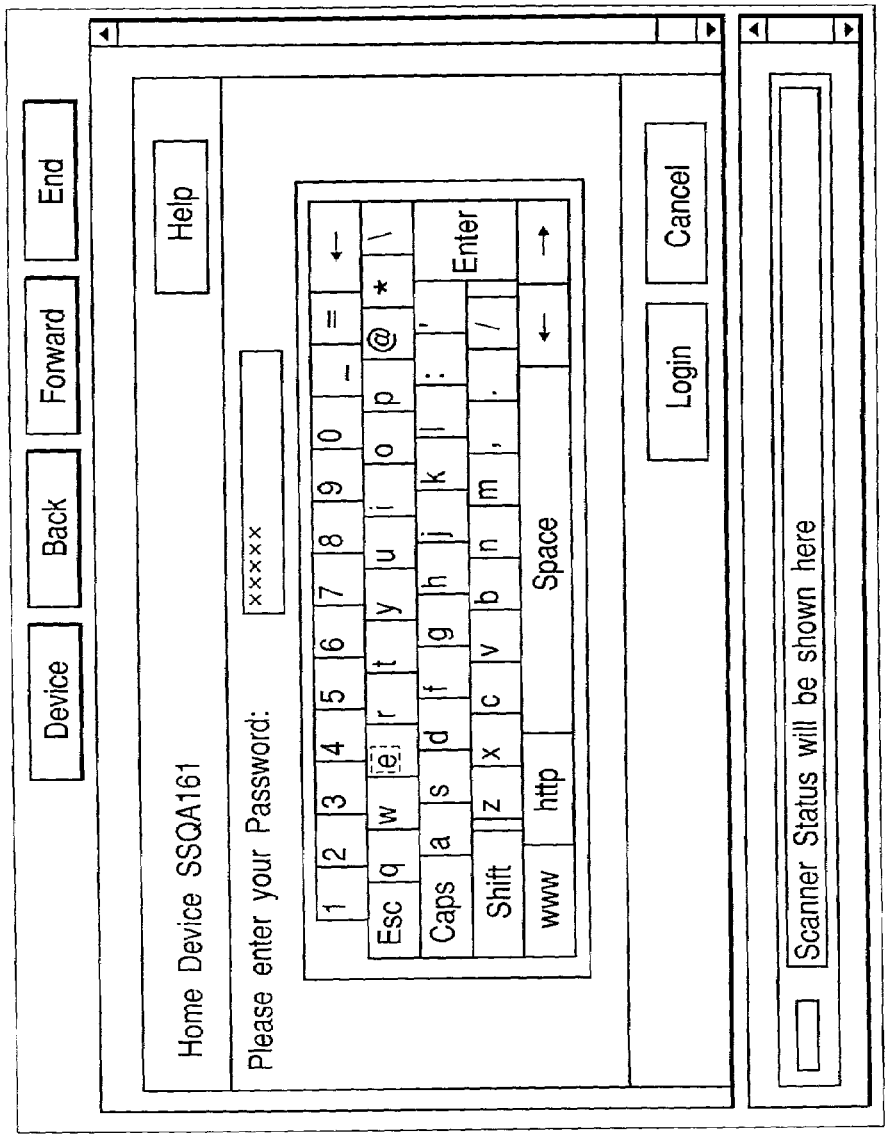
FIG. 14 is a drawing showing an example of a login screen.

FIG. 6 is a flow chart showing the flow of login screen processing corresponding to login screen operations. As described previously, login screen processing is launched if "Scan Setting" or "Main Menu" is selected on the initial menu screen, and if an original is set on the reading unit and the information that is automatically read from the original is sent, together with an Auto Scan request, from the client. FIG. 14 is a drawing showing an example of a login screen.

When login screen processing is launched, the request is obtained at step S601, and next, at step S602, the request is analyzed, with the processing branching to the corresponding processing at the next step S603.

If the request is a Login request, processing advances to step S604, and the login user is refreshed with the user name input by the operator, from the client. Next, at step S605, processing branches based on instructions issued by the operator immediately prior to the login screen being displayed.

If "Scan Setting" was instructed immediately prior to this point, processing advances to step S606, and a screen HTML page for scan setting is created. Next, at step S609, this page is sent to the client, and is terminated. If "Main Menu" was instructed immediately prior to this point, processing advances to step S607, and a screen HTML page for the main menu is created. Next, at step S609, this page is sent to the client, and is terminated. If automatic reading of a document was carried out immediately prior to this point, processing advances to step S608, and a screen HTML page for an auto scan is created. Next, at step S609, this page is sent to the client, and is terminated.

If the request is a Cancel request, processing advances to step S610, and the screen HTML page immediately prior to the previous page is created. Next, at step S609, this page is sent to the client, and is terminated. If the request is a Help request, processing advances to step S611, and a screen HTML page for initial menu Help functions is created. Next, at step S609, this page is sent to the client, and is terminated. If the request is any other request, processing advances to step S612, and the general request processing is executed, the processing corresponding to requests which are common to all of the screens, and processing is terminated.

Figure 7:
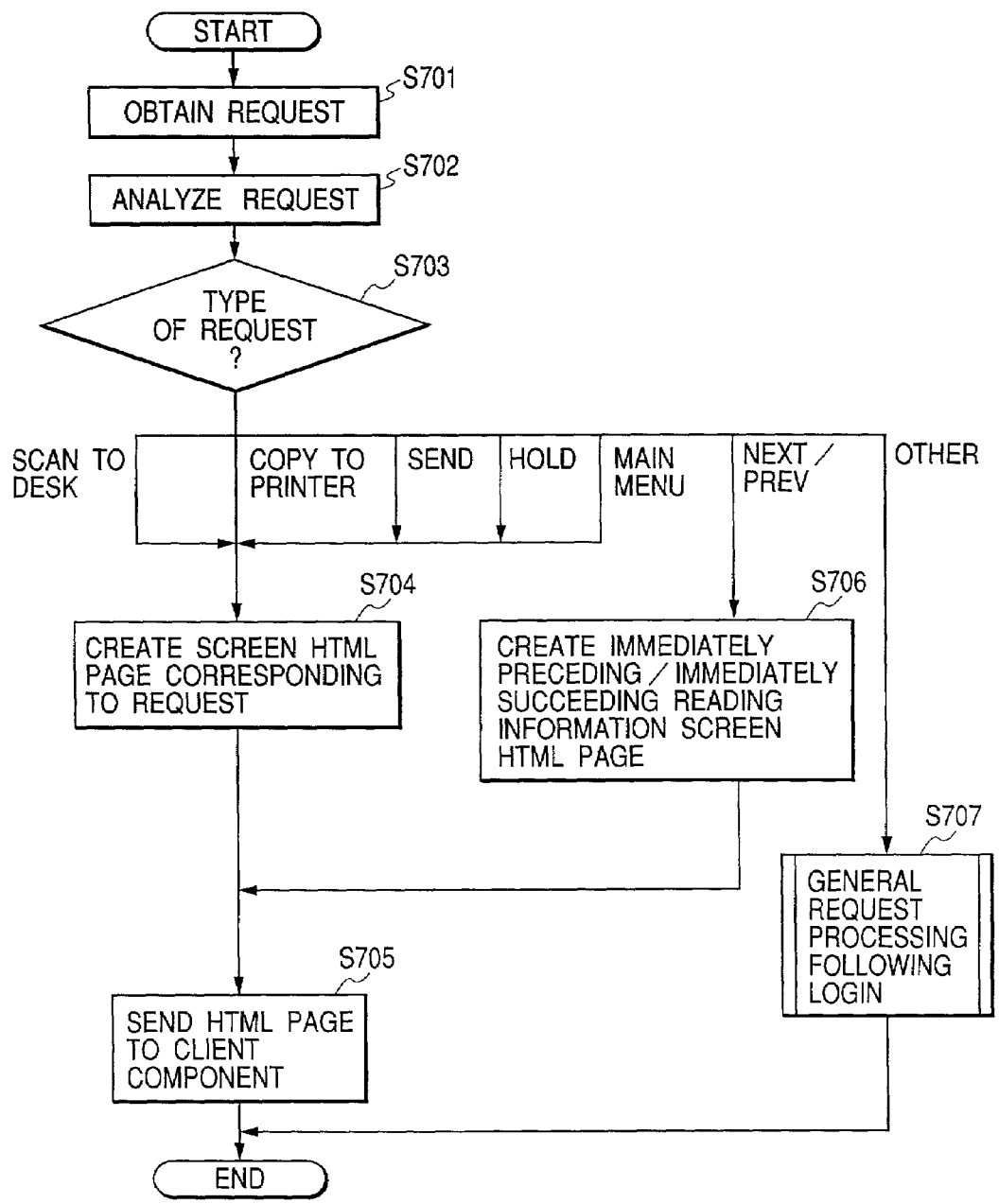
FIG. 7 is a flow chart showing the flow of processing on the screen following automatic reading.
Figure 15:
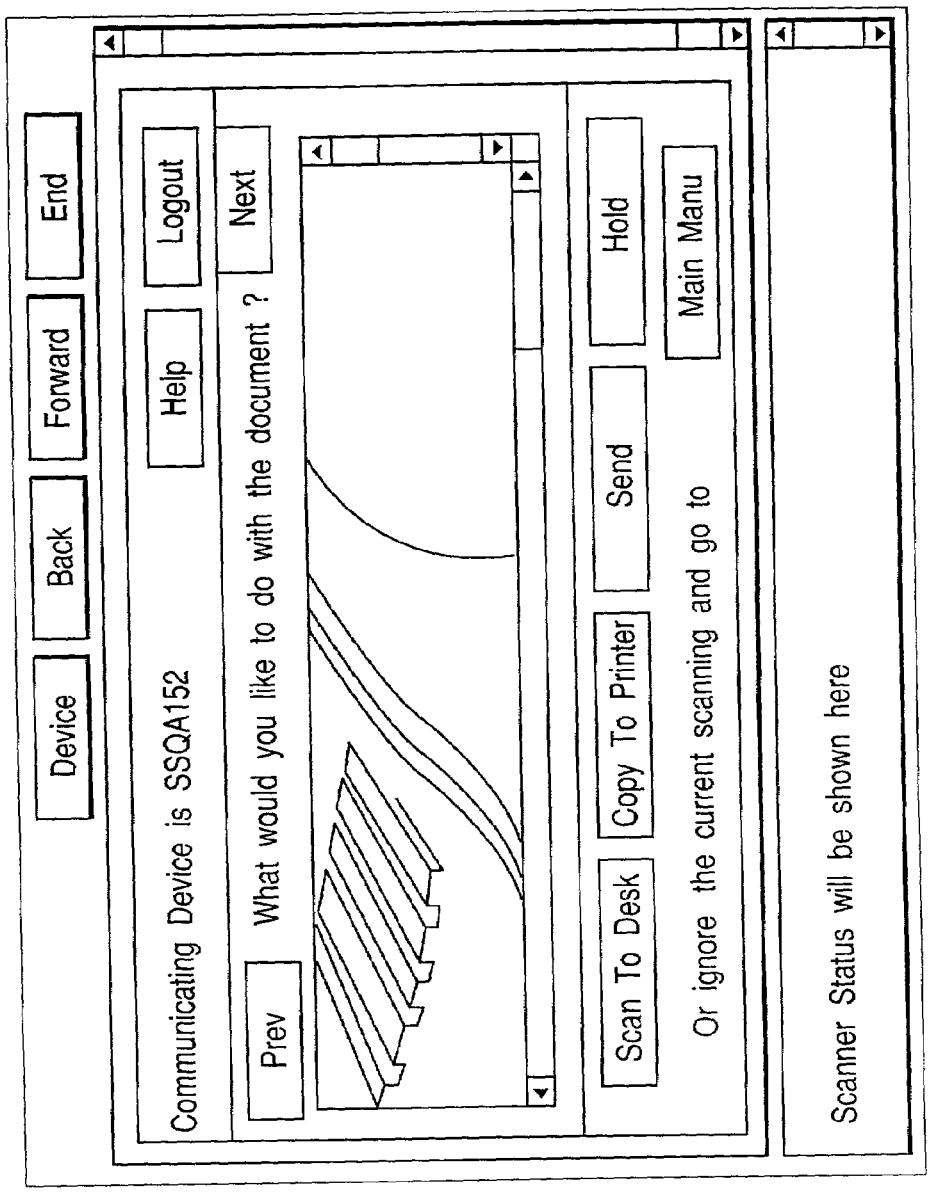
FIG. 15 is a drawing showing an example of a screen following automatic reading.

FIG. 7 is a flow chart showing the flow of processing on the screen following automatic reading. Screen processing following automatic reading is launched if the operator has set an original on the reading unit and the original has been automatically read and a login has been carried out. Screen processing then corresponds to the operations for the screen following the automatic reading, displayed at that time. FIG. 15 is a drawing showing an example of a screen following automatic reading. As shown in FIG. 15, the image that has been read is displayed in the center of the screen following automatic reading. If multiple images have been read, the first image, for instance, is displayed.

At this point, if the operator has, for instance, instructed "Multi Page" for "Document" on the Scan setting screen, the multiple pages which have been read are sent from the client to the server so as to be processed as a single document. In the same way, if "Single Page" has been specified, each of the various pages that have been read are sent from the client to the server so as to be processed as individual documents. This processing will be described in detail at a later point.

On the screen following automatic reading, to send the image that has been read to his or her own desktop, the operator selects "Scan to Desk". To print the image that has been read, the operator selects "Copy to Printer". To send the image that has been read to a designated location, the operator selects "Send". To retain the image that has been read in the scanner, the operator selects "Hold". To select another function, the operator selects "Main Menu".

On the screen following automatic reading displayed on the client, if the operator initiates any type of operation, a request corresponding to the operation is sent from the client to the server, and the screen processing following automatic reading which corresponds to the operation screen currently displayed on the client is launched by the server. In the screen processing following automatic reading, at step S701, a request is obtained, and next, at step S702, the request is analyzed. At the subsequent step S703, processing branches to the processing corresponding to the request.

If the request is a "Scan to Desk", "Copy to Printer", "Send", "Hold", or "Main Menu" request, processing advances to step S704, and a screen HTML page corresponding to the respective request is created. Next, at step S705, this page is sent to the client, and is terminated.

If the request is a "Next" or "Prev" request, processing advances to step S706, and a screen HTML page is created which displays, of the multiple documents read in response to the operator's instruction, the page immediately prior to or immediately subsequent to the currently displayed document which is targeted for processing. Next, at step S705, this page is sent to the client and is terminated.

Figure 8:
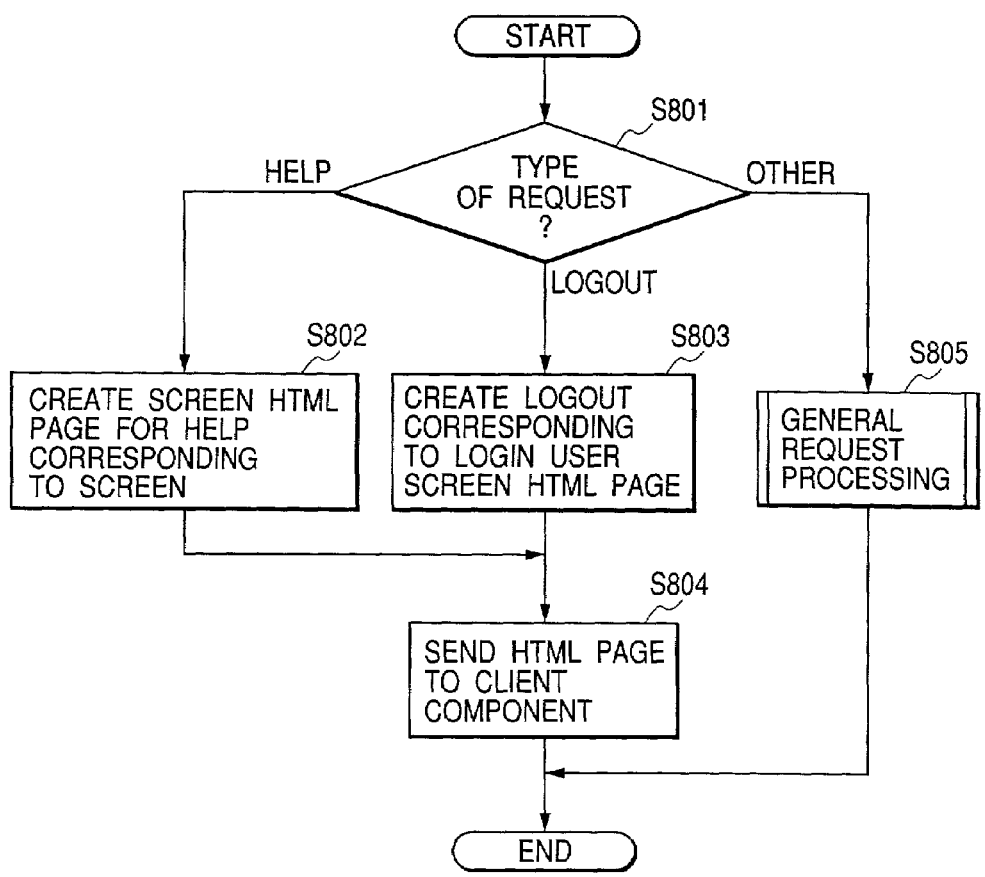
FIG. 8 is a flow chart showing the flow of general request processing following login.

If the request is any other request, processing advances to step S707, and the general request processing following login, which will be described at a later point with respect to FIG. 8, is executed and terminated. This processing is processing which corresponds to requests common to all screens in a series of screens following login.

FIG. 8 is a flow chart showing the flow of general request processing following login. When general request processing following login is launched, processing branches at step S801, depending on the type of request.

If the request is a Help request, processing advances to step S802, and a screen HTML page for Help functions corresponding to the operation screen currently displayed by the client is created. Next, at step S804, this page is sent to the client, and is terminated. If the request is a Logout request, processing advances to step S803, and a screen HTML page for Logout corresponding to the user who has logged in is created. Next, at step S804, this page is sent to the client, and is terminated. If the request is any other request, processing advances to step S805, and the general request processing described with respect to FIG. 5 is executed and terminated.

Figure 9:
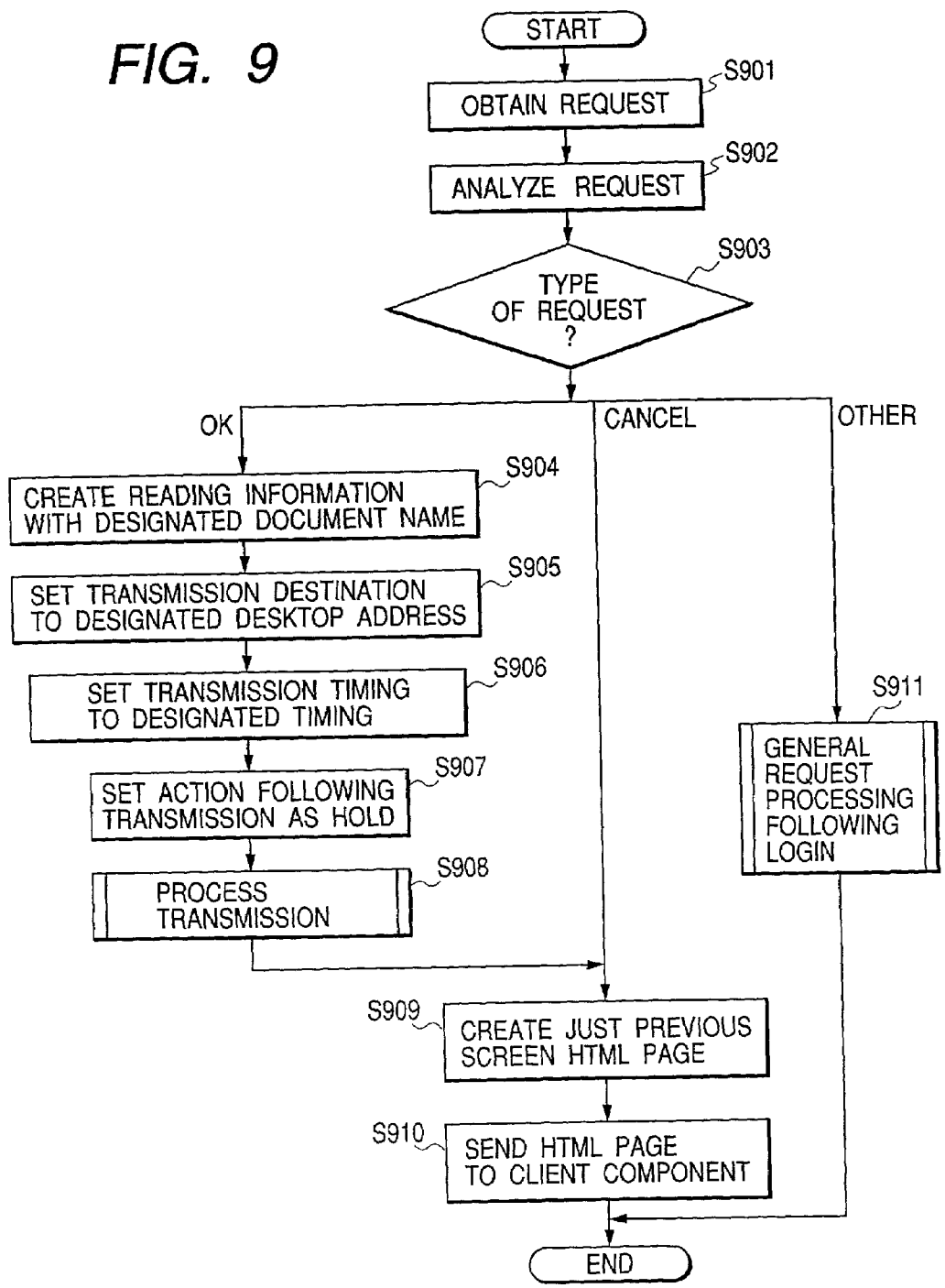
FIG. 9 is a flow chart showing the flow of screen processing for standard transmission of information that has been read.
Figure 16:
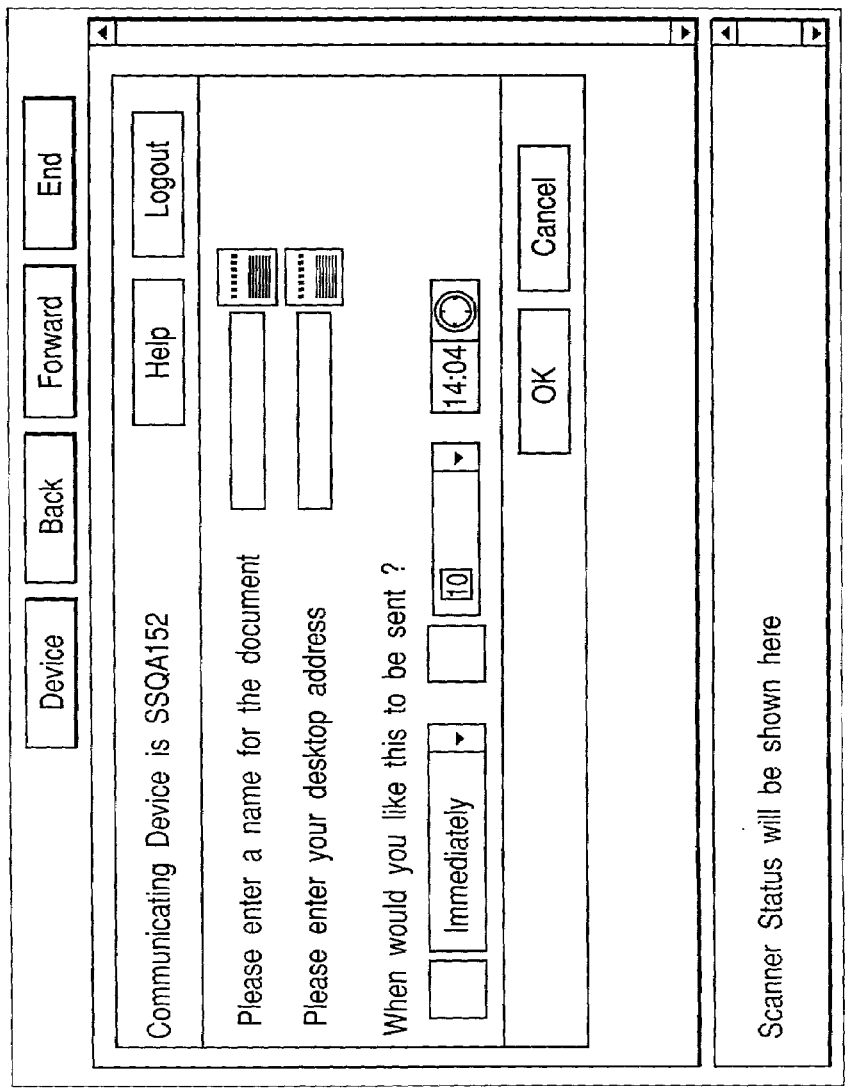
FIG. 16 is a drawing showing an example of a screen for standard transmission of information that has been read.

FIG. 9 is a flow chart showing the flow of screen processing for standard transmission of information that has been read. Processing for standard transmission of information that has been read is launched when "Scan to Desk" is selected on the screen following automatic reading, and corresponds to operations on the screen for standard transmission of information that has been read which is displayed at that time. FIG. 16 is a drawing showing an example of a screen for standard transmission of information that has been read.

When processing for standard transmission of information that has been read is launched, the request is obtained at step S901, and is then analyzed at step S902, with processing branching at step S903 based on the type of request.

On the setting screen shown in FIG. 16, in order to send the information which has been read to his or her own desktop, the operator specifies the name of the document which must be assigned to the file containing the information that has been read, the address of his or her own desktop, to which the information is to be sent, and the timing at which the transmission must take place.

If "OK" is selected after these settings have been entered, processing advances to step S904, and a file is created by the client for the information that has been read, with the document name specified by the operator. At step S905, the desktop address to which the information is to be sent, which has been specified in the same way, is set as the transmission destination, and at step S906, the timing which has been specified in the same way is set as the transmission timing. At step S907, the action following transmission is set as "Hold".

Following this, at step S908, in accordance with the above settings, a transmission job is created and is stored in the data base. Daemon processing then transmits the file of information that has been read to the specified desktop address at the specified timing.

Next, at step S909, a screen HTML page is created for the immediately previous screen, and at step S910, this page is sent to the client and is terminated.

If the request is a Cancel request, processing advances to step S909, and the screen HTML page for the screen immediately prior to the current screen is created. Next, at step S910, this page is sent to the client, and is terminated.

If the request is any other request, processing advances to step S911, and the general request processing described with respect to FIG. 5 is executed, and processing is terminated.

Figure 10:
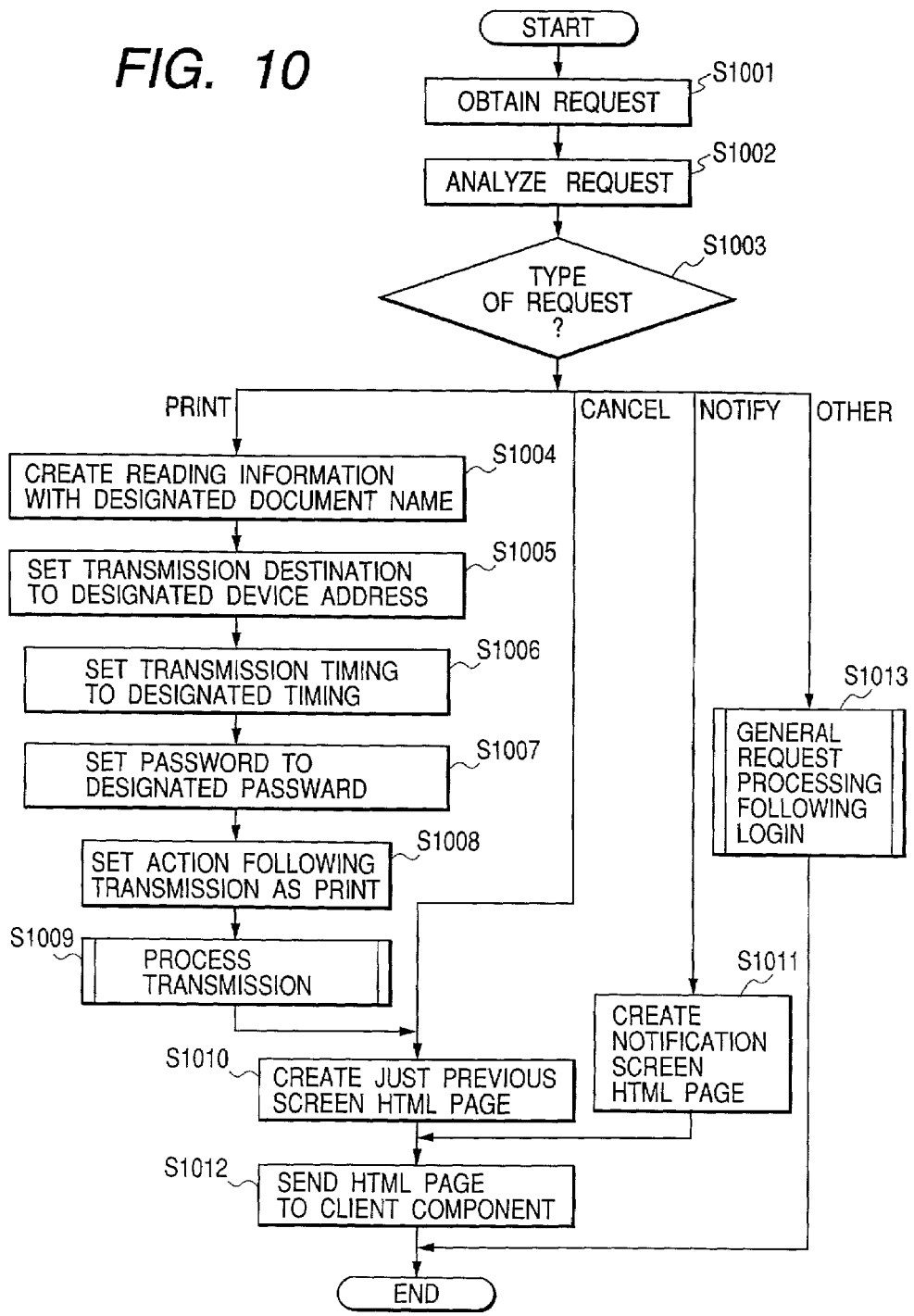
FIG. 10 is a flow chart showing the flow of screen processing for printing information that has been read.
Figure 17:
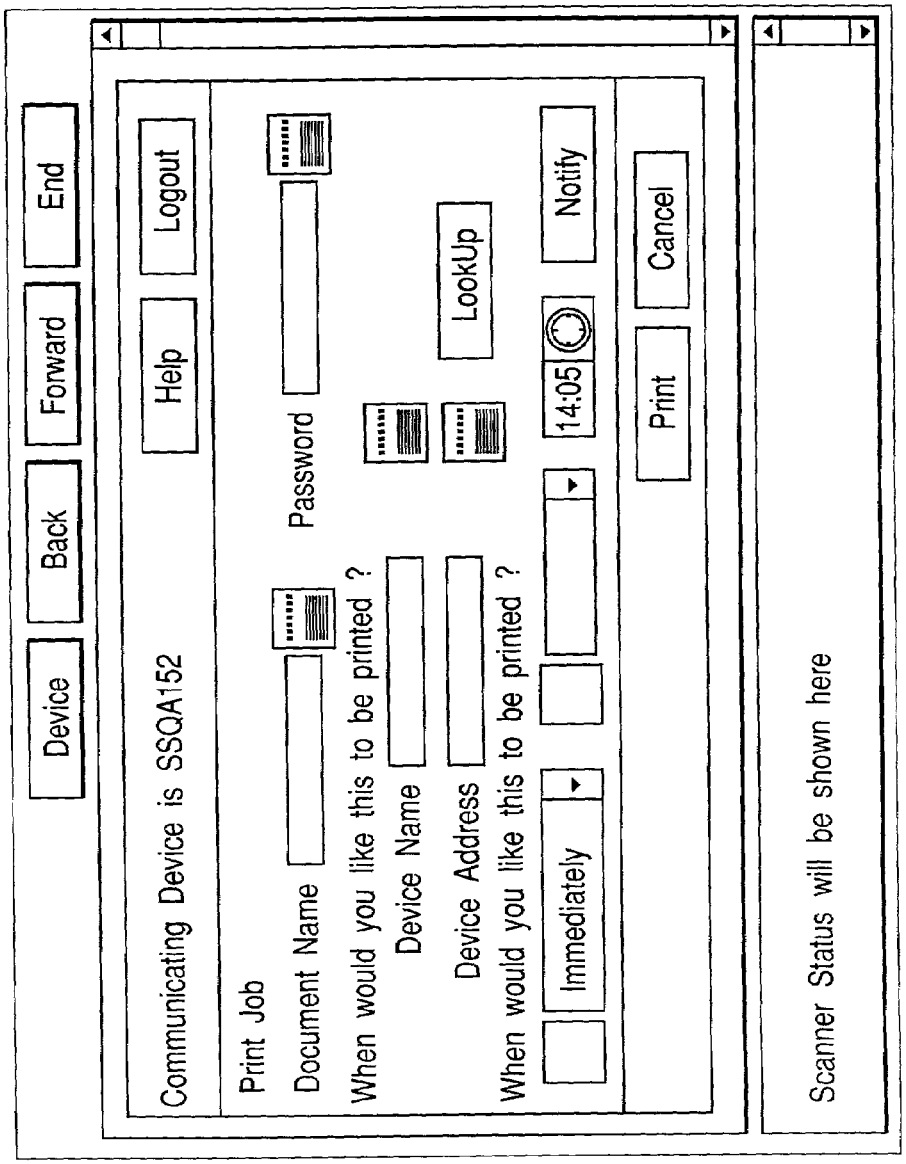
FIG. 17 is a drawing showing an example of a screen for printing information that has been read.

FIG. 10 is a flow chart showing the flow of screen processing for printing information that has been read. Screen processing for printing of information that has been read is launched when "Copy to Printer" is selected on the screen following automatic reading, and corresponds to operations on the screen for printing information that has been read which is displayed at that time. FIG. 17 is a drawing showing an example of a screen for printing information that has been read.

When screen processing for printing information that has been read is launched, the request is obtained at step S1001, and is then analyzed at step S1002, with processing branching at step S1003 based on the type of request.

On the setting screen shown in FIG. 17, in order to send the information which has been read to a specified printer and print it, the operator specifies the name of the document which must be assigned to the file containing the information that has been read, the device name of the printer which is to execute the printing, and the timing at which the printing must take place. Also, if necessary, a password may be specified which restricts access to the document.

If "Print" is selected after these settings have been entered, processing advances to step S1004, and a file is created by the client for the information that has been read, with the document name specified by the operator. At step S1005, the device address, which has been specified in the same way, is set as the transmission destination, and at step S1006, the timing which has been specified in the same way is set as the transmission timing. At step S1007, the password specified in the same way is set as the password, and at step S1008, the action following transmission is set as "Print".

Following this, at step S1009, in accordance with the above settings, a transmission job is created and is stored in the data base. Daemon processing then transmits the file of information that has been read to the specified printer at the specified timing.

Next, at step S1010, a screen HTML page is created for the immediately previous screen, and at step S1012, this page is sent to the client and is terminated.

If the request is a Cancel request, processing advances to step S1010, and the screen HTML page for the screen immediately prior to the current screen is created. Next, at step S1012, this page is sent to the client, and is terminated.

If the request is a Notify request, processing advances to step S1011, and a screen HTML page for notification is created. Next, at step S1012, this page is sent to the client, and is terminated. With the screen HTML page for notification, when printing is executed, a specification can be entered such that notification is made to the specified device. If the request is any other request, processing advances to step S1013, and the general request processing described with respect to FIG. 5 is executed, and processing is terminated.

Figure 11:
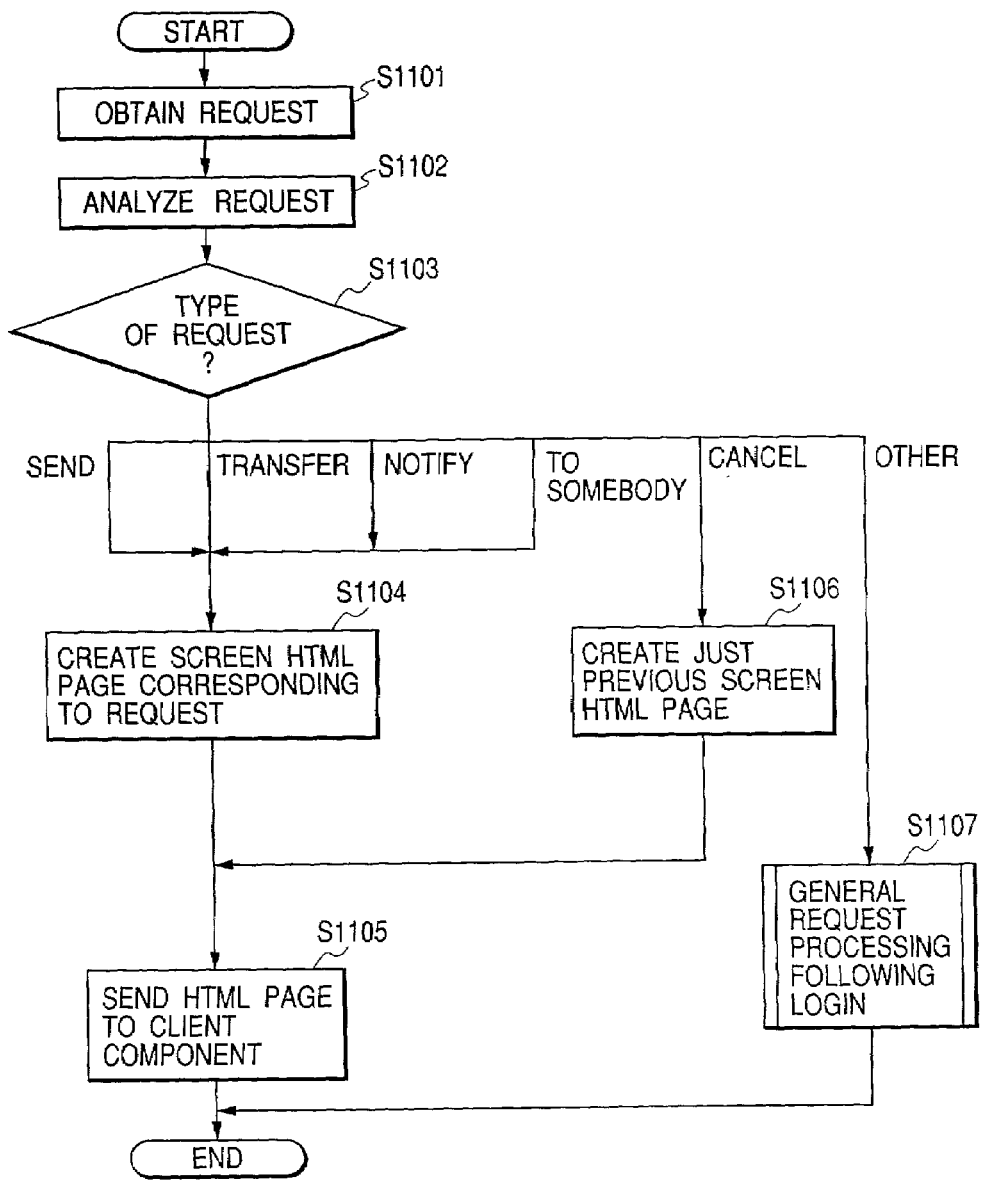
FIG. 11 is a flow chart showing the flow of screen processing for transmitting information that has been read.
Figure 18:
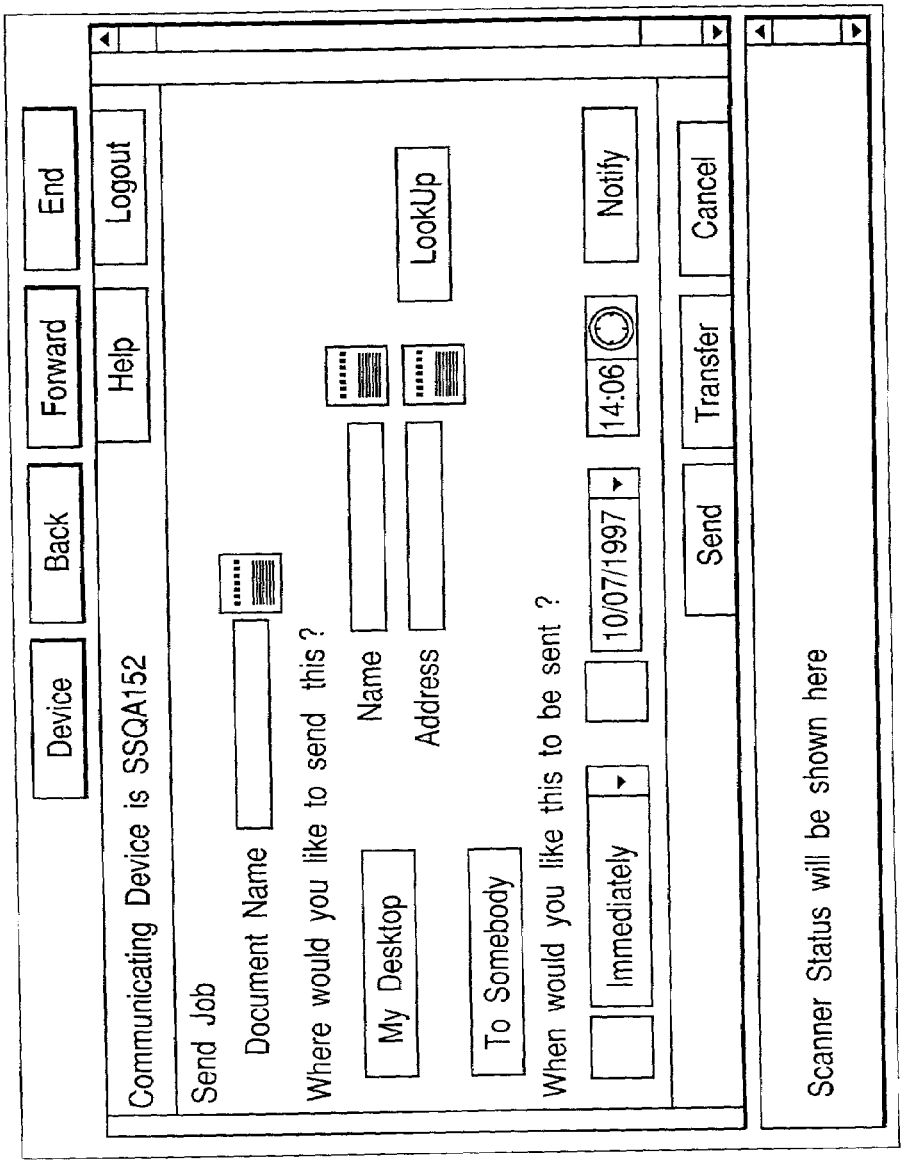
FIG. 18 is a drawing showing an example of a screen for transmitting information that has been read.

FIG. 11 is a flow chart showing the flow of screen processing for transmitting information that has been read. Screen processing for transmitting information that has been read is launched when "Send" is selected on the screen following automatic reading, and corresponds to operations on the screen for transmitting information that has been read which is displayed at that time. FIG. 18 is a drawing showing an example of a screen for transmitting information that has been read.

When screen processing for transmitting information that has been read is launched, the request is obtained at step S1101, and is then analyzed at step S1102, with processing branching at step S1103 based on the type of request.

On the screen shown in FIG. 18, "Send" is selected if the information at the transmission source end is to be copied and the information is to remain at the transmission source end, and "Transfer" is selected if the information is to be transmitted without remaining at the transmission source end. "To Somebody" is selected if the information is to be transmitted to another person.

If the request is a "Send", "Transfer", "Notify", or "To Somebody" request, processing advances to step S1104, and a screen HTML page corresponding to the request is created. At step S1105 this page is sent to the client and is terminated.

If the request is a Cancel request, processing advances to step S1106, and the screen HTML page for the screen immediately prior to the current screen is created. Next, at step S1105, this page is sent to the client, and is terminated.

If the request is any other request, processing advances to step S1107, the general request processing which corresponds to requests common to all screens is executed, and processing is terminated.

Figure 12:
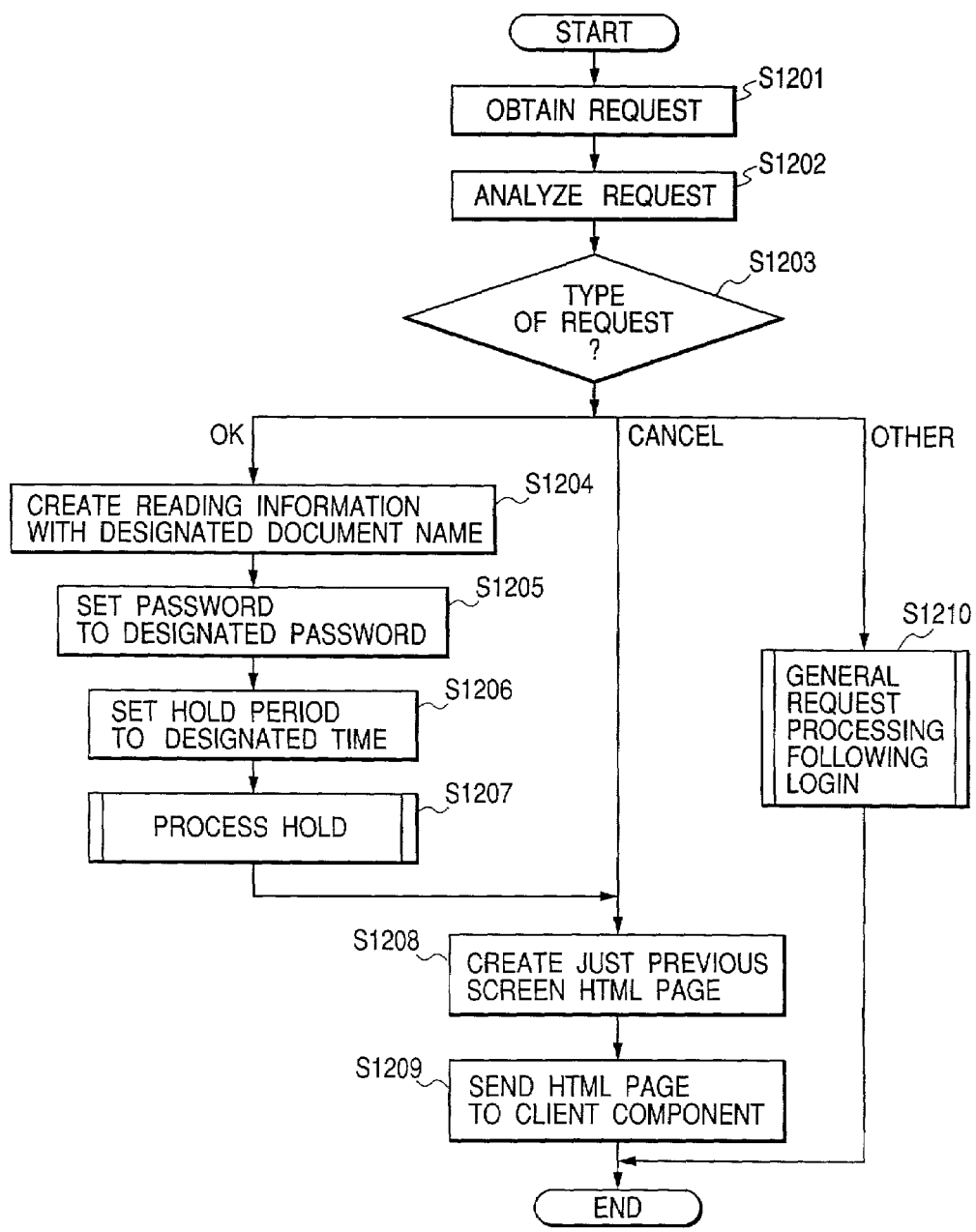
FIG. 12 is a flow chart showing the flow of screen processing for standard transmission of information that has been read.
Figure 19:
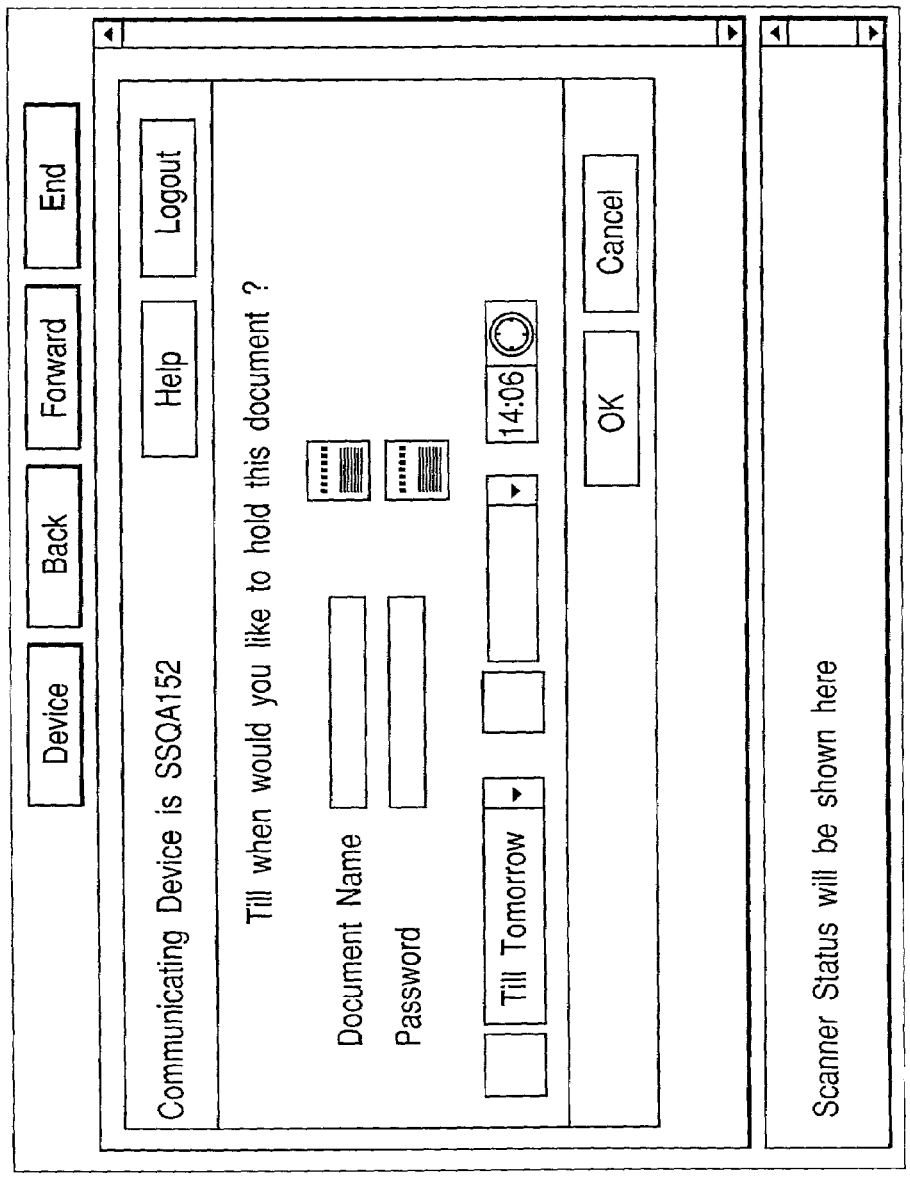
FIG. 19 is a drawing showing an example of an information hold screen.

FIG. 12 is a flow chart showing the flow of screen processing for holding information that has been read. Screen processing for holding information that has been read is launched when "Hold" is selected on the screen following automatic reading, and corresponds to operations on the screen for holding information that has been read which is displayed at that time. FIG. 19 is a drawing showing an example of a screen for holding information that has been read.

When the screen processing for holding information that has been read is launched, a request is obtained at step S1201, and next, at step S1202, the request is analyzed, with the processing branching to the corresponding processing at the next step S1203.

On the setting screen shown in FIG. 19, the restrictions applying to the document name, password, and information to be held are specified. After the settings have been entered, issuing an "OK" request causes processing to advance to step S1204, where a file is created for the information that has been read, using the document name specified by the operator. Next, at step S1205, the specified password is set, and at step S1206, the specified hold restrictions are set.

Following this, at step S1207, a hold job is created in accordance with the above settings, and is stored in the data base. Daemon processing then holds the information that has been read until the specified timing has expired. During the time that the information is being held, if an operation is requested which pertains to the information being held, the daemon requests input of the password, and as long as the input password matches the specified password, operation is permitted which involves displaying, printing, sending, deleting, or changing the hold timing for the information being held.

Next, at step S1208, a screen HTML page is created for the immediately previous screen, and at step S1209, this page is sent to the client and is terminated.

If a Cancel request is received, processing advances to step S1208, and the screen HTML page for the screen immediately prior to the current screen is created. Next, at step S1209, this page is sent to the client, and is terminated. If the request is any other request, processing advances to step S1210, and the general request processing described with respect to FIG. 5 is executed, and processing is terminated.

FIG. 20 is a flow chart showing the flow of reading processing executed in the reading unit when the actual original is read.

When the reading processing is launched, at step S2001, the various data items used and referenced in this processing, such as "Page", "TempFileNo", and "Count", are initialized to 0.

At this point, "Page" indicates the number of the page currently being read, and "TempFileNo" indicates the number of the file containing the original that is currently being read. "Count" indicates the number of pages remaining in the original currently being read, and the processing for obtaining the specified number, which is described at a later point with respect to FIG. 21, obtains the specified number of pages corresponding to the current starting page, from data specifying the number of pages which has been specified in advance. Using these data items, an original consisting of multiple pages which have been read can be handled as either one or multiple documents, as specified.

Next, at step S2002, the original set in position by the operator is detected, and processing advances to step S2003, where the "Page" parameter which indicates the number of pages is incremented.

Next, at step S2004, a judgment is made as to whether or not the remaining number of pages for the "Count" parameter is 0, and if any value other than 0, processing advances to step S2007. If the number of remaining pages is judged to be 0, processing advances to step S2005, where the "TempFileNo" parameter which indicates the number of the file containing the original that has been read is incremented. Next, at step S2006, the "Count" parameter indicating the remaining number of pages which corresponds to the current page is obtained through processing which obtains the specified number of pages.

At step S2007, the original which has been read is stored in the file with the number indicated by the "TempFileNo" parameter, and at step S2008, the "Count" parameter indicating the remaining number of pages is decremented, and processing returns to step S2002.

The above processing is repeated until all of the processing pertaining to the original has been completed, at which point a judgment is made at step S2002 that there is no original which has been read, and processing is terminated.

FIG. 21 is a flow chart showing the flow of processing for obtaining the specified number of pages. Through this processing, the specified number of pages corresponding to the pages currently being read is obtained, in the reading processing that is carried out when the original is actually being read by the reading unit.

FIG. 22 is a drawing showing an example of data specifying the number of pages referenced in the processing for obtaining the specified number of pages described above. The operator of the reading unit described in the present embodiment can specify in advance the type of document from which the original which is to be read is configured, and processing can be carried out in accordance with that specification.

For example, the operator can specify that the entire original targeted for reading should be processed as a single document, or that each page of a multiple-page original should be processed as one document, or, based on the data specifying the number of pages, can specify that the original should be processed as multiple documents, each beginning from a specified starting page.

Returning to FIG. 21, the flow of processing for obtaining the specified number of pages will be explained. When the processing for obtaining the specified number of pages is launched, at step S2101, a judgment is made as to whether or not the operator has specified that all of the pages be handled as one document. If such a specification has been made, processing advances to step S2102, where the maximum number of pages is obtained as the specified number of pages.

If the operator has not specified that all of the pages are to be processed as one document, processing advances to step S2103, where a judgment is made as to whether or not the operator has specified that each page is to be handled as one document. If such a specification has been made, processing advances to step S2104, where one page is obtained as the specified number of pages.

If the operator has not specified that one page is to be processed as one document, processing advances to step S2105, where the specified number of pages in relation to the starting page corresponding to the current page is obtained with reference to the data specifying the number of pages as indicated in FIG. 22, and that number of pages is set as the specified number of pages and processing is terminated.

The present invention, although it may be applied to a device comprising a single unit, may also be applied to system configured of multiple units. Moreover, the present invention may also be achieved using a storage medium which stores the program codes of the software that actualize the functions of the embodiment described above, with the storage medium being made available to a device or a system, with a computer inside the device or system reading and executing the program codes housed in the storage medium.

Furthermore, by having the computer inside the device or system read and execute the program codes housed in the storage medium, not only can the functions of the embodiment described above be actualized directly, but based on the instructions supplied by the program codes, the functions described above may also be actualized in some cases through processing executed by the operating system running on the computer.

In these cases, the present invention is configured of the storage medium which stores the program codes.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing apparatus comprising:

specifying means for specifying numbers of page data consisting of data in a plurality of document files to be created, by referring to a table which defines the respective numbers of page data for the plurality of document files independently;

scanning means for scanning multiple-page data of a document;

counting means for setting the number specified for one of the plurality of document files, counting a number of page data scanned by said scanning means and resetting the number specified for next one of the plurality of document files when the counted number reaches the currently set number;

dividing means for separating the multiple-page data of the document scanned by said scanning means each time the counted number reaches the specified number, thereby dividing the multiple-page data of the document into a plurality of document data in which each one of the document data corresponds to the respective one of the numbers of page data defined in the table;

generation means for generating respective file identifiers for the plurality of document data divided by said dividing means; and file creation means for creating the plurality of document files in a memory and storing the plurality of document data divided by said dividing means into respective document files in correspondence with the respective file identifiers.

2. An information processing apparatus according to claim 1, wherein said specifying means can specify one as the number of page data for each of the plurality of document files without referring to the table.

3. An information processing apparatus according to claim 1, further comprising printing means for printing the plurality of document data.

4. An information processing method comprising:

a specifying step, of specifying numbers of page data consisting of data in a plurality of document files to be created, by referring to a table which defines the respective numbers of page data for the plurality of document files independently;

a scanning step, of scanning multiple-page data of a document;

a counting step setting the number specified for one of the plurality of document files, of counting a number of page data scanned in said scanning step and resetting the number specified for next one of the plurality of document files when the counted number reaches the currently set number;

a division step, of separating the multiple-page data of the document scanned in said scanning step each time the counted number reaches the specified number, thereby dividing the multiple-page data of the document into a plurality of document data in which each one of the document data corresponds to the respective one of the numbers of page data defined in the table;

a generation step, of generating respective file identifiers for the plurality of document data divided in said division step; and a file creation step, of creating the plurality of document files in a memory and storing the plurality of document data divided in said division step into respective document files in correspondence with the respective file identifiers.

5. An information processing method according to claim 4, wherein said specifying step can specify one as the number of page data for each of the plurality of document files without referring to the table.

6. An information processing method according to claim 4, further comprising a print step, of printing the plurality of document data.

7. A computer-readable storage medium storing a program for controlling a computer to perform information processing, said program comprising:

code for a specifying step, of specifying numbers of page data consisting of data in a plurality of document files to be created, by referring to a table which defines the respective numbers of page data for the plurality of document files independently;

code for a scanning step, of scanning multiple-page data of a document;

code for a counting step, of setting the number specified for one of the plurality of document files, counting a number of page data scanned by said code for a scanning step and resetting the number specified for next one of the plurality of document files when the counted number reaches the currently set number;

code for a division step, of separating the multiple-page data of the document scanned by said code for a scanning step each time the counted number reaches the specified number, thereby dividing the multiple-page data of the document into a plurality of document data in which each one of the document data corresponds to the respective one of the numbers of page data defined in the table;

code for a generation step, of generating respective file identifiers for the plurality of document data divided in the division step; and code for a file creation step, of creating the plurality of document files in a memory and storing the plurality of document data divided in the division step into respective document files in correspondence with the respective file identifiers.

* * * * *

UNITED STATES PATENT AND TRADEMARK OFFICE
CERTIFICATE OF CORRECTION

| | | |
|---|---|---|
| PATENT NO. | : 7,209,246 B2 | Page 1 of 1 |
| APPLICATION NO. | : 09/178896 | |
| DATED | : April 24, 2007 | |
| INVENTOR(S) | : Aruna Rohra Suda et al. | |

It is certified that error appears in the above-identified patent and that said Letters Patent is hereby corrected as shown below:

ON COVER PAGE AT (*) NOTICE

Insert:   --This patent issued on a continued prosecution application filed under 37 CFR 1.53(d), and is subject to the twenty year patent term provisions of 35 U.S.C. § 154(a)(2).--.

SHEET 10

FIG. 10, "PASSWARD" should read --PASSWORD--.

SHEET 15

FIG. 15, "MANU" should read --MENU--.

COLUMN 4

Line 57, "branches" should read --branches out--.

COLUMN 6

Line 7, "branches" should read --branches out--.

COLUMN 7

Line 13, "ing" should read --ing out--; and
    Line 67, "branching" should read --branching out--.

Signed and Sealed this

Sixteenth Day of September, 2008

JON W. DUDAS
*Director of the United States Patent and Trademark Office*